US009286266B1

(12) United States Patent
Fleck et al.

(10) Patent No.: US 9,286,266 B1
(45) Date of Patent: Mar. 15, 2016

(54) CLOUD COMPUTED DATA SERVICE FOR AUTOMATED REPORTING OF VEHICLE TRIP DATA AND ANALYSIS

(71) Applicant: Left Lane Network, Inc., Palo Alto, CA (US)

(72) Inventors: David Fleck, Atherton, CA (US); Don Harris, Campbell, CA (US)

(73) Assignee: Left Lane Network, Inc., Palo Alto, CA (US)

( * ) Notice: Subject to any disclaimer, the term of this patent is extended or adjusted under 35 U.S.C. 154(b) by 0 days.

(21) Appl. No.: 13/887,832

(22) Filed: May 6, 2013

Related U.S. Application Data

(60) Provisional application No. 61/643,015, filed on May 4, 2012.

(51) Int. Cl.
*G06F 17/00* (2006.01)
(52) U.S. Cl.
CPC .................................... *G06F 17/00* (2013.01)
(58) Field of Classification Search
CPC ............ G06F 17/00; G05B 2219/4001; G01C 21/3617; B60W 2050/0089; G01S 5/0018; H04Q 2209/826; H04Q 2209/86
USPC .............. 701/29.4, 31.4, 29.6, 33.4, 31.5, 24, 701/32.4, 33.3, 34.3, 36; 340/457; 342/419; 700/236, 237; 702/63; 709/203, 219, 709/225

See application file for complete search history.

(56) References Cited

U.S. PATENT DOCUMENTS

| | | | |
|---|---|---|---|
| 5,557,524 A * | 9/1996 | Maki | 701/32.4 |
| 5,787,373 A * | 7/1998 | Migues et al. | 701/527 |
| 5,918,180 A | 6/1999 | Dimino | |
| 6,330,499 B1 | 12/2001 | Chou et al. | |
| RE40,799 E * | 6/2009 | Chen | 701/33.2 |
| 8,311,858 B2 * | 11/2012 | Everett et al. | 705/4 |
| 8,645,014 B1 * | 2/2014 | Kozlowski et al. | 701/24 |
| 2005/0143882 A1 * | 6/2005 | Umezawa | 701/29 |
| 2006/0017552 A1 * | 1/2006 | Andreasen et al. | 340/438 |
| 2007/0150139 A1 * | 6/2007 | Hardy | 701/35 |
| 2007/0250258 A1 * | 10/2007 | Hager | 701/201 |
| 2011/0112717 A1 * | 5/2011 | Resner | 701/33 |
| 2012/0078682 A1 * | 3/2012 | Pinsley et al. | 705/7.29 |
| 2012/0136765 A1 * | 5/2012 | Corn | 705/34 |
| 2012/0176255 A1 * | 7/2012 | Choi et al. | 340/989 |
| 2012/0191242 A1 * | 7/2012 | Outwater et al. | 700/236 |
| 2012/0197743 A1 * | 8/2012 | Grigg et al. | 705/16 |
| 2014/0032381 A1 * | 1/2014 | Killian et al. | 705/30 |
| 2014/0052789 A1 * | 2/2014 | Marcucci et al. | 709/204 |

OTHER PUBLICATIONS

"Mavison FAQ", www.mavison.com/faq/, (2012), 1 pg.
"Vehicle Logbook Available Now!", http://tinkerbuilt.com/2009/07/vehicle-logbook-released/, (2009), 1 pg.
(Continued)

*Primary Examiner* — Marthe Marc-Coleman
(74) *Attorney, Agent, or Firm* — Schwegman Lundberg & Woessner, P.A.

(57) ABSTRACT

This disclosure generally relates to systems and methods to receiving onboard diagnostic data associated with an operational state of a vehicle of a user and pushing a message to the user, the message including information associated with the onboard diagnostic data.

27 Claims, 16 Drawing Sheets

(56) References Cited

OTHER PUBLICATIONS

Ebert, Stephen, "Mavia car diagnostic tool: Drive-by Facebook check ins soon to become reality", http://www.electricpig.co.uk/2011/01/05/mavia-car-diagnostic-tool-drive-by-facebook-check-ins-soon-to-become-reality/, (Jan. 5, 2011), 6 pgs.

Edwards, Cliff, "Calling All Cars: The Man Behind the AutoBot", www.businessweek.com/magazine/content/10_47b4204049297803.htm, (Nov. 11, 2010), 1 pg.

McManus, Richard, "Connect Your Car the the Web with AutoBot", www.readwriteweb.com/archives/autobot_connect_your_car_to_the_web.php, (Oct. 27, 2010), 2 pgs.

Shaivitz, Maria, "The Mavia Connected Car by Mavizon Technologies", http://techcocktail.com/the-mavia-connected-car-by-mavizon-technologies-2011-01#.T5mFHY4ZCHk, (Jan. 4, 2011), 9 pgs.

Stevens, Tim, "AutoBot app tracks your car if it tries to roll without you", http://www.engadget.com/2010/11/21/autobot-app-tracks-your-car-if-it-tries-to-roll-without-you/, (Nov. 21, 2010), 7 pgs.

\* cited by examiner

CLOUD COMPUTED DATA SERVICE FOR AUTOMATED REPORTING OF VEHICLE TRIP DATA AND ANALYSIS

CLAIM OF PRIORITY

This patent application claims the benefit of priority of U.S. Provisional Patent Application Ser. No. 61/643,015 to Fleck et al., entitled "Vehicle Monitoring System," filed on May 4, 2012, which is incorporated herein by reference in its entirety.

BACKGROUND

Modern vehicles such as automobiles are able to provide electronic data containing information about the vehicle, including measured or derived parameters such as water temperature, engine torque, power, vehicle mileage and maintenance flags. However, these data are not always available in a form accessible to people who do not have specialized training and/or purpose-built data-readers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed in some examples are methods, systems, and machine readable media which enable vehicle users to manage and enhance their relationships with their vehicles. The system may provide an integrated interface in which users may monitor vehicle status, track vehicle costs, enhance their vehicle experience by connecting with other users of the system, and the like.

Examples can monitor and automatically calculate vehicle trip segment data for related allowable expense reimbursement from an employer, allowable vehicle expenses for tax deduction and per trip segment data to support billable client expenses for drive time and distance, among other things. Examples can provide an integrated interface and automatic reports of each trip or trip segment, in which user can monitor vehicle trip expense, vehicle status.

Examples include an application referred to as the Tripdots application, the "Tripdots app" or the "app." The Tripdots app can be stored on and operated by a mobile device such as a handset. The Tripdots app can function as part of an Tripdots system, which can include the mobile device, one or more networks, one or more servers such as to store data and provide access thereto (locally or remotely), on or more modules to run on devices of the system, services to communicate information with the system, and other systems and methods as set forth herein.

Figure 1:
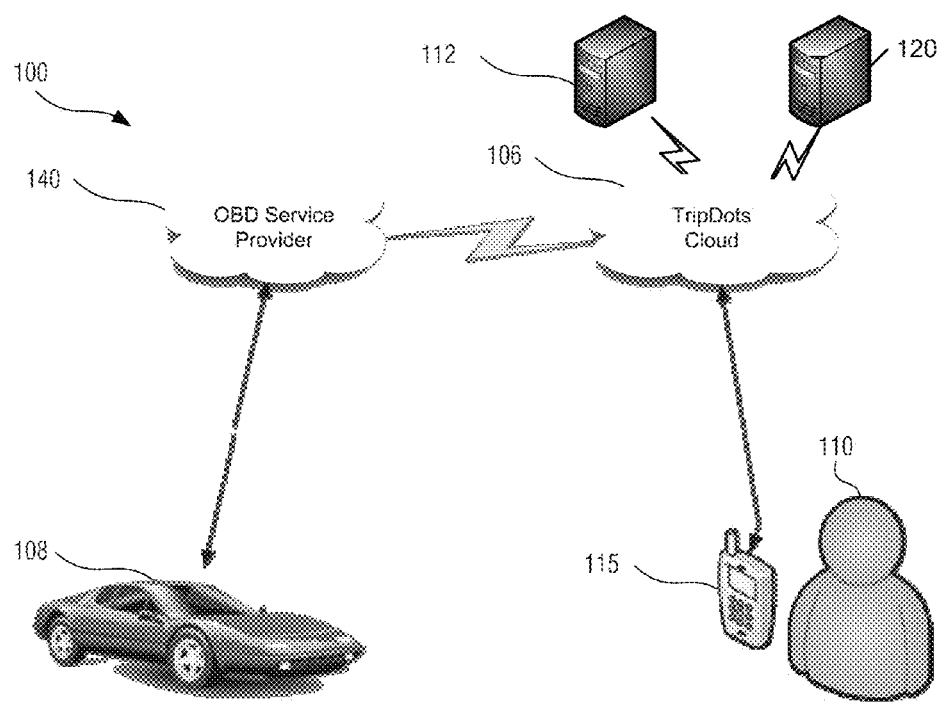
FIG. 1 is a block diagram depicting a system, according to an example.

FIG. 1 is a block diagram depicting a system, according to an example.

The figure illustrates an embodiment of the Tripdots system 100, in which a user 110 can operate a mobile device 115 to operate the app. The app can communicate over an Tripdots cloud or network 106, which can provide for certain internet-based communications including information associated with the vehicle 108.

Figure 2:
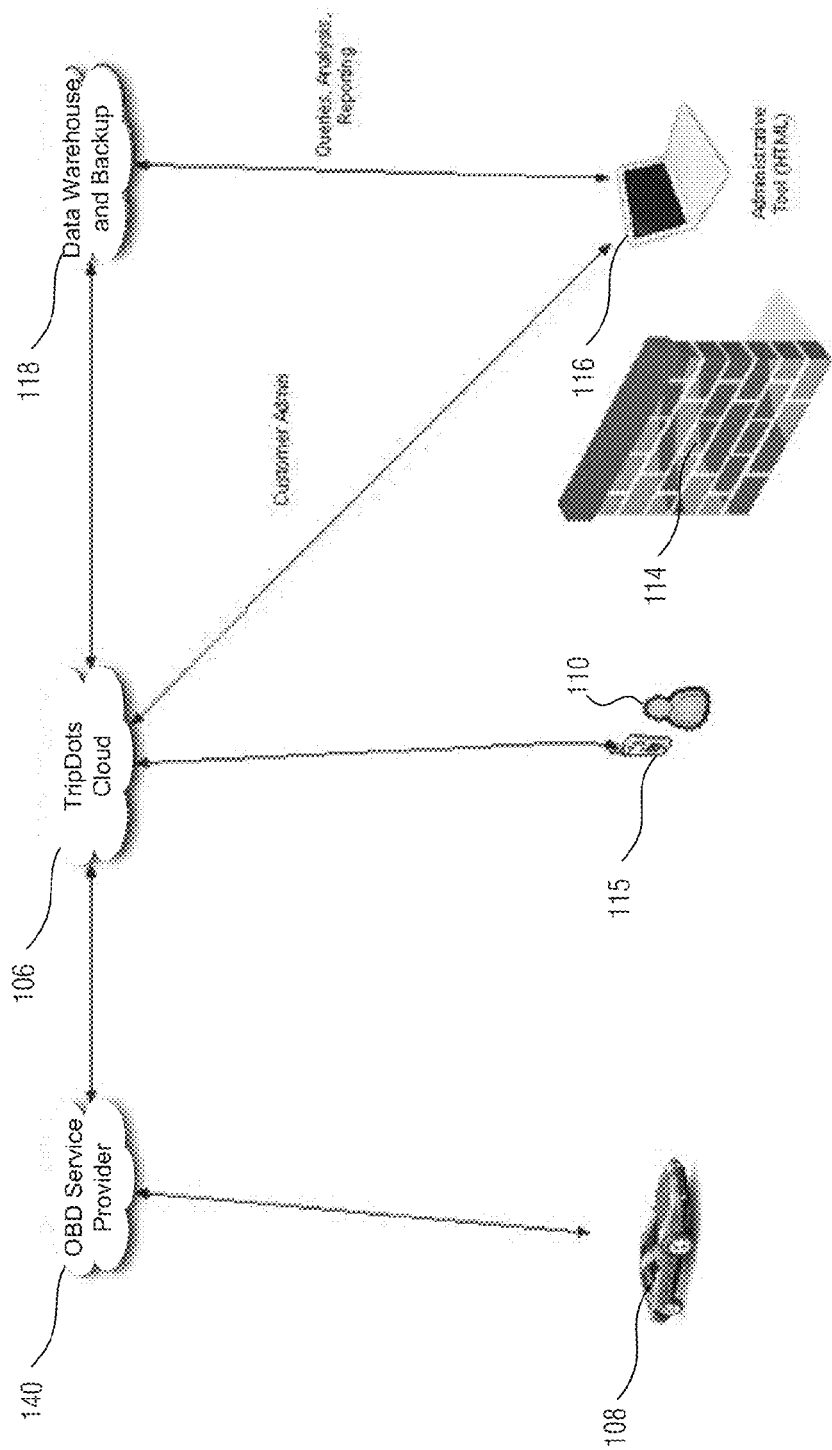
FIG. 2 is a block diagram depicting a system for delivering vehicle monitoring processes, and administrating such delivery, according to an example.

FIG. 2 is a block diagram depicting a system for delivering vehicle monitoring processes, and administrating such delivery, according to an example embodiment. The Tripdots network 106 can operate over the internet, behind one or more security walls 114. In an example, an administrative tool, such as an account management application can operate on a device 116. Such a tool allows account administrators, other than users, to view and edit user accounts, such as from a location other than the user's location. Examples include data warehouse and/or backup 118 which can store information about the user 110, the mobile device 115, the vehicle 106, and information related to any one of the services described herein (e.g., 112, 120, 140 as illustrated in FIG. 1).

Figure 3:
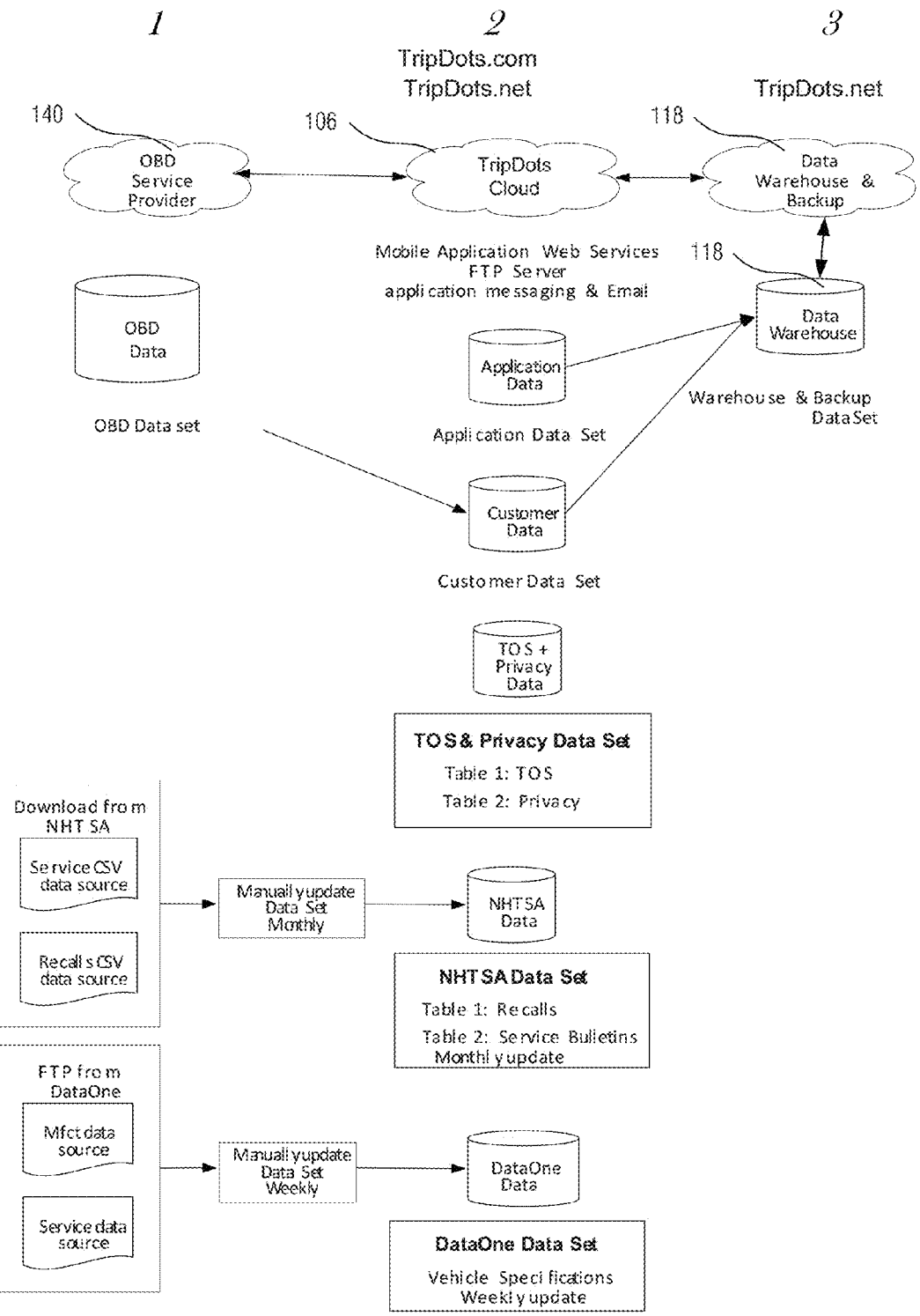
FIG. 3 is a block diagram of one implementation of the Tripdots service, according to an example.
Figure 4:
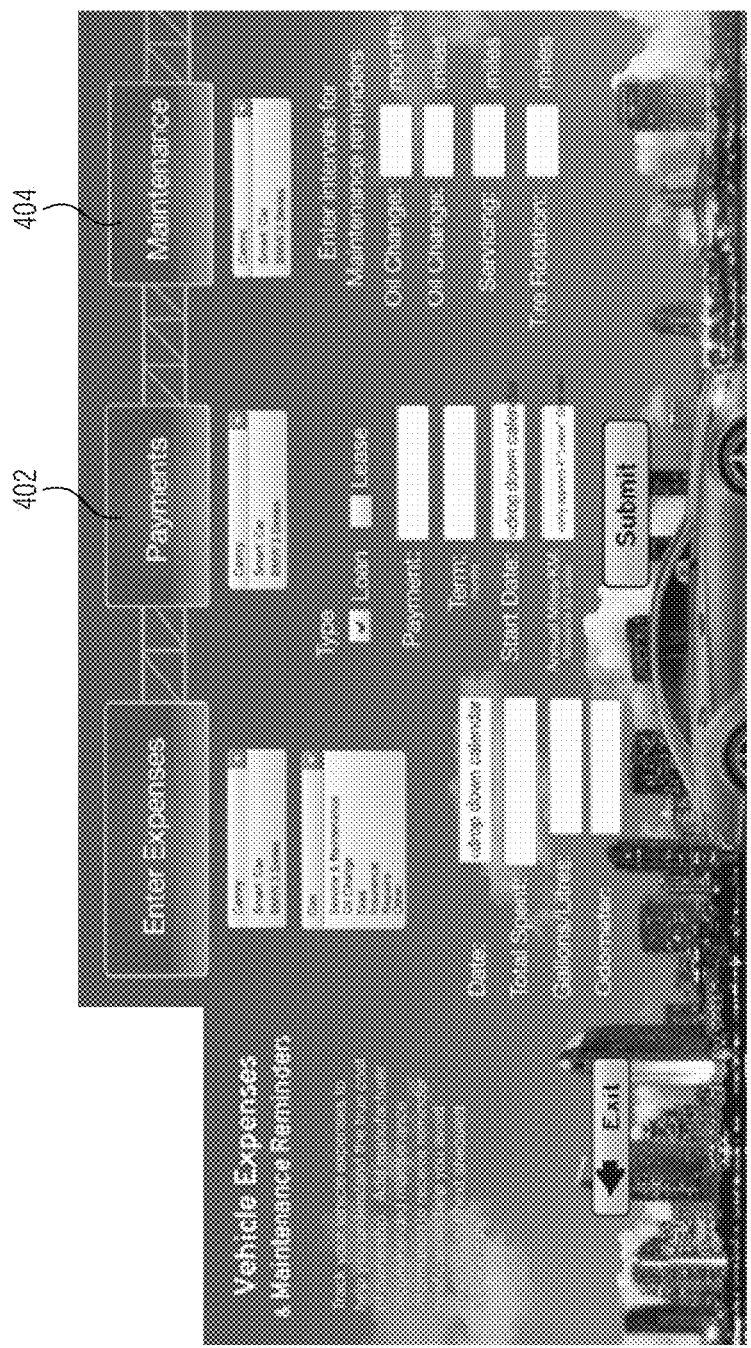
FIG. 4 shows a display showing field to enter expense information, according to an example.
Figure 5B:
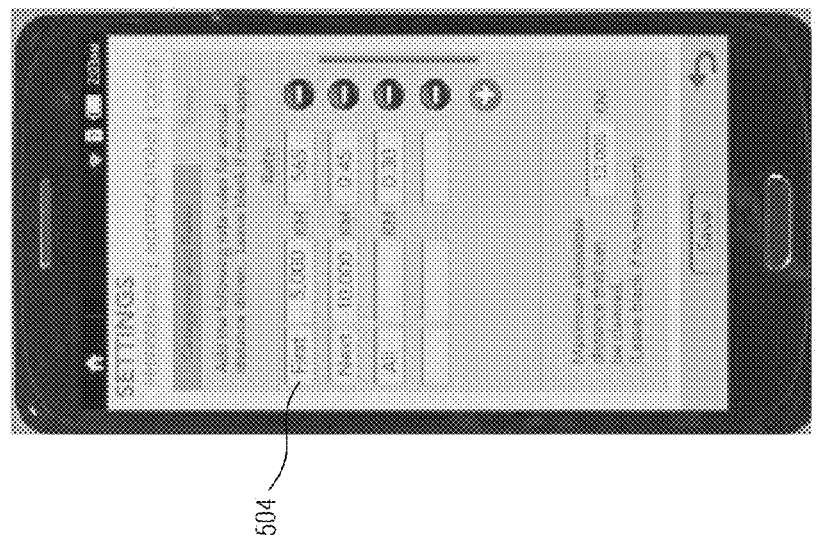
FIG. 5B shows a display showing field to enter expense rules, according to an example.
Figure 5A:
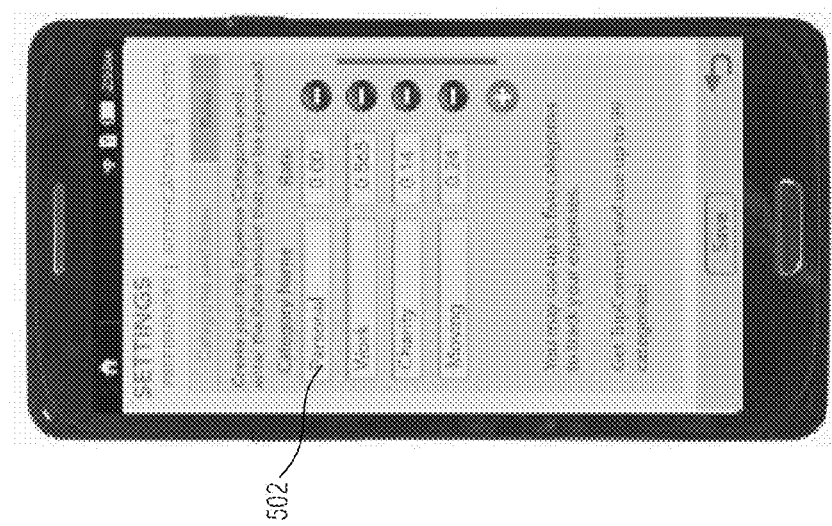
FIG. 5A shows a display showing field to enter expense rates, according to an example.
Figures 6A, 6B:
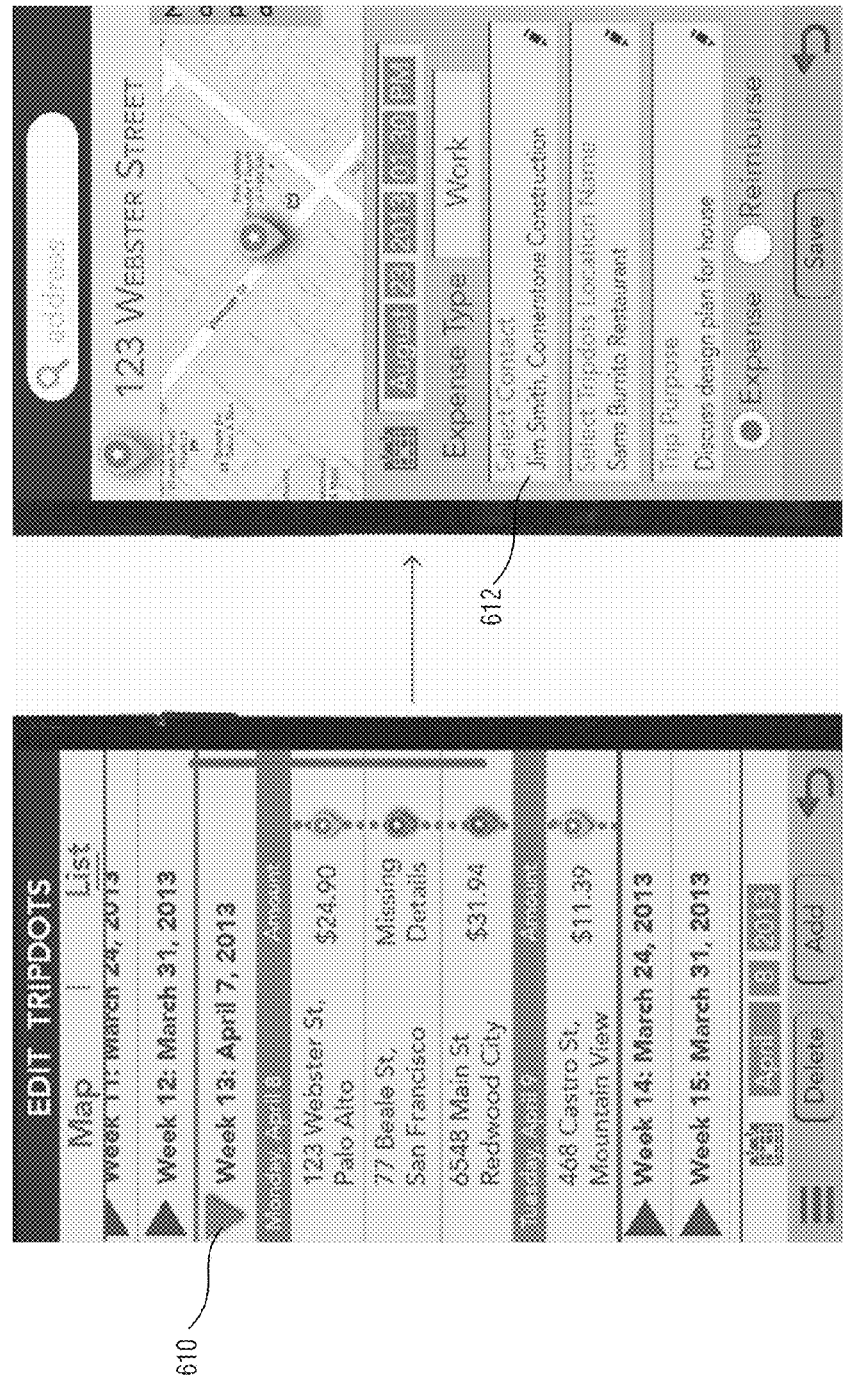
FIG. 6A shows a week-by-week list of trips and expenses, according to an example.
FIG. 6B shows additional information associated with an expense, according to an example.

FIG. 3 is a block diagram of one implementation of the Tripdots service. Column 1 shows services in communication with the Tripdots network 106 to communicate information to the Tripdots network 106 when prompted to. In some cases, the services are provided with information sufficient to permit such communication. Column 2 shows data including executable applications and other information stored on a first cloud network, the Tripdots network 106. The Tripdots network 106 can comprise networked computers operating behind a security wall. An example of the Tripdots network 106 is a Microsoft Azure cloud network. Column 3 shows data including executable applications and other information stored on a second cloud network 118. The second network 118 can comprise networked computers operating behind a security wall. An example of the second cloud network 118 can be an Amazon A3 cloud network. The cloud networks need not be separate. Further, they can be greater than two in number, configured to communicate with one another, openly or securely.

As shown, the Tripdots network 106 can be accessed via one or more domains, Tripdots.com and Tripdots.net, and the second cloud network 118 can be accessed via one or more domains, with one of them optionally being shared with the Tripdots network 106. In this manner, an account management application can operate on a device 116 and access the data including executable applications and other information on one or both of the Tripdots network 106 and the second network 118.

Returning to FIG. 1 the system 100 can include an optional network-based check-in system 120 and an OBD or vehicle head unit interface 140. An OBD or vehicle head unit interface can include an API. The interface can include an associated network service. The OBD or vehicle head unit interface 140 is an optional service to extract OBD information from the vehicle and communicate it to the Tripdots network 140. In an example, the OBD or vehicle head unit interface includes a device coupled to the vehicle and configured for wired or wireless communications with other devices of the OBD or vehicle head unit interface 140 to receive OBD information and derive or relay messages associated with the OBD information to the Tripdots network 106. In some examples, the OBD or vehicle head unit interface (which can comprise any service configured to communicate with a vehicle communication bus) can communicate with the vehicle 108 to transact information related to operation of the vehicle, including, but not limited to, parameters associated with emissions production, performance parameters, and other parameters. In an example, the user 110 can connect to the network-based check-in system 120 via a mobile device 115 (e.g., smart phone, PDA, laptop, or similar mobile electronic device capable of some form of data connectivity). Other services 112 can operate as part of the Tripdots network 106, as set forth herein.

The Tripdots app can be configured to provide information about a vehicle 108 in a manner useful to a wide range of vehicle operators. Here it should be noted that a vehicle operator is not necessarily an app user, although in some embodiments this is true. Information about the vehicle 108 can be used to improve the way a vehicle operator operates a vehicle, including providing information to guide maintenance, information to better enable users to perform preventative maintenance and information to improve the efficiency of vehicle operation. Some examples provide information usable to lower the total cost or expense of ownership of the vehicle. Some examples provide other information, such as social network messaging, that can make the vehicle ownership experience enjoyable, and in some instances, enable others to comment on information associated with the vehicle.

Tripdots app examples disclosed herein can provide users with information about their vehicles that is relayed or derived from onboard diagnostics ("OBD"). In various examples, the information is communicated between the vehicle and the app using a protocol. Examples of protocols include, but are not limited to, an OBD-II compatible protocol, including, but not limited to SAE standard J1850 which defines a serial data protocol; SAE standard J1978 which defines minimal operating standards for OBD-II scan tools; SAE standard J1979 which defines standards for diagnostic test modes; SAE standard J2012 which defines standards trouble codes and definitions; SAE standard J2178, which defines standards for network message header formats and physical address assignments, provides data parameter definitions, defines standards for network message frame IDs for single byte headers and defines standards for network messages with three byte headers; and SAE standard J2284-3 which defines 500K CAN Physical and Data Link Layer, a protocol compatible with SAE standard J1939, and other protocols.

Examples include a device, connectable to an OBD connector of a vehicle in some examples, for providing vehicle information to the Tripdots app. The information can include any of the vehicle information disclosed herein and available via a vehicle communication data bus. The device can relay or derive vehicle information and communicate the information to the Tripdots app, via corded or wireless communications. The communications can optionally pass through a service, such as an OBD or vehicle head unit interface 140 located on a network and adapted to provide the information to the Tripdots app, such as via a wireless communication network that is in communication with a mobile device 115 on which the Tripdots app is stored and operated. The device is referred to as an TripConnect Device in some examples.

App examples can provide users with information about their vehicles relayed or derived from external services, such as a service communicating with the Tripdots service over a network such as the internet. Vehicle information can be relayed or derived from an original equipment manufacturer or a supplier thereto, for example.

App examples can include a portion that is free to use. Other features can be enabled once a user purchases and installs a device such as to couple with a vehicle, such as a device configured to mate to a vehicle connector such as a standard connector, which can be an OBD-II compatible connector or another connector coupled to an onboard data bus, e.g., the TripConnect Device.

App examples can monitor engine performance of the vehicle 108. In an example, engine performance is derived from one or more engine parameters, including, but not limited to, one or more of water temperature, oil temperature, rotations per minute, mass airflow, air-to-fuel ratio, knock sensor status, timing advance, fuel injector duty cycle, torque output and other engine or engine-related parameters are received by the application. These parameters can be monitored in real-time, or relayed or derived from data stored in a memory on a vehicle.

App examples can display diagnostics, such as via an OBD reader device, e.g., the TripConnect Device. One or more of the parameters of the vehicle 108 can be used to provide a diagnostic. Such information can be made available at an onboard connector of the vehicle 108 so that a device such as a code-reader can receive the information and make a diagnostic. In some examples, the diagnostic is determined, such as by using sensor data, by an onboard computer of the vehicle and is provided to an onboard vehicle connector in the form of a code or message readable by a device to display the code or message and relay related information, e.g., an explanation of the issue. As such, diagnostics can be relayed or derived from vehicle data that can include data present on a vehicle data bus such as an onboard diagnostic communication bus.

App examples can enable social networking. In an example, an application can communicate vehicle information with other users, e.g. users indicated to be friends. Being a friend means assuming a state in which there has been a one-way or two-way approval flag set by one or both users (the friends), respectively, stored in association with a user account on another device that in communication with the application. App examples can provide linking and posting location (e.g., check-in) to social media websites such as Facebook. The app can display any of this information to the user 110.

App examples can receive and push messaging and display notifications relevant to the user's location and to vehicles owned. In an example, the app executes on a mobile device, and is in communication with another device (e.g., another computer forming a part of, or in communication with, the Tripdots network 106) that can analyze data, communicated with the app and/or another source, and push messages or notifications to the mobile device in association with the data. The data can be pushed in association with vehicle data, such as location data transmitted to the other device. Notifications can be relayed or derived from information pushed from the other device.

Applications can display at least one of vehicle related cost or expense information, vehicle tracking and vehicle management. In an example, the application can be provided with expense information associated with vehicle operation. Examples include, but are not limited to, expense information provided by another device in communication with the application, the expense information associated with at least one of spending in a location, spending with a specific bank account, vehicle mileage, time of operation, and combinations thereof. The expense information can also be provided directly to a mobile device on which the application is stored and which is configured to execute the application. In some examples, a point-of-sale device can provide expense information to the mobile device. In some examples, the expense information is inputted manually to the mobile device. In some examples, a log is kept, either on the device on which the application operates, or another device, of vehicle locations. Vehicle locations can include stored GPS information, or other information, including, but not limited to, point of sale information. Some examples provide notifications related to at least one of vehicle location, vehicle operation duration, vehicle distance traveled, etc., to provide maintenance notifications.

Examples provide for the calculation per trip segment expense and trip segment value for employer reimbursement. Examples can allow tax deductions for one or more documented trips.

App examples can display maintenance reminders. In an example, the application can generate maintenance reminders based on at least one of manually entered information, information monitored from a vehicle, and information communicated to a mobile device on which the application is configured to execute. Information can be communicated with another networked computer.

Related vehicle trip distance calculations with data including purpose of trip, contact, date time, start and end locations can automate the calculation and report for employer expense reimbursement. Examples can allow for tax deductions for the related vehicle data.

App examples are configured to operate one or more mobile device components to retrieve information on the vehicle 108 using an internet search for the VIN. In some examples, the retrieved information is stored and automatically associated with the user's account. This information may be stored locally or (in one of the cloud's).

In some examples, the Tripdots network 106 may contact one or more external data sources over a network. For example, the app may contact a server run by the National Highway Transportation and Safety Administration and retrieve information related to safety, recall, service bulletins and crash test scores. The app may retrieve this by using application protocol interface (API) calls made available by these services to access this data, or may scrape Internet WebPages provided by these data sources.

App examples can display manufacturer technical specifications for the vehicle, such as by using vehicle information and/or the VIN to perform an internet query. App examples can display EPA information including expected fuel mileage and green score (i.e., a measure of emissions), such as by using vehicle information and/or the VIN to perform an internet query. App examples can display accolades and awards published for the vehicle, such as by using vehicle information to perform an internet query. App examples can display OEM supplied data such as photos, such as by using vehicle information to perform an internet query.

In some examples, users may interact with another device to access information related to their vehicle. In one example, accessing a website, for example Tripdots.com or Tripdots.net, can provide access to the information. As described herein, the information can be accessed using a network such as a cloud network. In some examples, the Tripdots app is configured to operate on a mobile device running a Windows Phone 7 (i.e. Mango) operating system developed by Microsoft Corp., of Redmond Wash. Some examples are configured to operated on a mobile device running an Apple iOS, developed by Apple Inc., of Cupertino Calif. Some examples are configured to operate on a mobile device running a Google Android operating system, developed by Google Inc., of Mountainview Calif.

Examples can include one or more of the modules disclosed herein, such as: MODULE 1: New User Account Registration & Login 1520; MODULE 2: User Settings, Vehicle Selection & Use Entry initial entry of vehicle mileage and expense 1505; MODULE 3: Vehicle Calculations, Performance Gauges and Push Messaging 1530; MODULE 4: Social Networking, Messaging and Leader Board 1510; MODULE 5: TripConnect Device Interfacing with Cloud network 1540; and MODULE 6: Administrative Web Portal and User Account 1515. Each module can function independently or in conjunction with the others to deliver information to perform functions discussed herein. Accordingly, the app can include one or more of the modules. One or more of the modules can also operate on another device of the Tripdots network, 106, such as a computer. Other modules 1550 can be included. A demonstration of how additional modules 1452 can interact as part of the Tripdots system is set forth in FIG. 15.

Module 1: New User Account Registration and User Account Login

Upon installing the Tripdots app, such as on a mobile device, users can be granted access to features programmed into the application without having to complete a mandatory registration. Registration can be requested in order for users to use some features. Users can have the option to register after installation should they choose to do so. In an example, registration can include one or more of the following:

Creation of a user account. The user account may include information such as car information (e.g., make, model, VIN, or the like), user information (such as name, email address, username, password, or the like), a list of friends, or the like. The user account information may be stored either on the mobile device, the Tripdots network, or any other component of system 100

Storage of an acceptance of terms of service ("TOS").

Storage of an acceptance of a privacy policy (e.g., information such as text content, resident on a device on which the application executes or hosted remotely and provided via web services).

In some examples, the user may enter social networking information (e.g., Facebook Connect) which may be used by the service 100 to automatically retrieve one or more registration fields from the social networking service thereby obviating the need for the user to enter that information.

A splash screen can be displayed. The application can interface with services such as web services to place an ad on the splash screen.

Registration via a service (e.g., Facebook Connect).

An account event notification communicated to another service, such as Microsoft Live Tile.

Storage of a user service period start date and/or an account creation date.

Storage of one or more of account creation date and time, IP address of a device on which an account is created and last access date and time.

A welcome push notification to a user mobile device number ("MDN").

An OBD (e.g., OBD-II) device activated screen that visually indicates the OBD-II device has been activated and is registered to the user's Tripdots mobile application.

Upon registration, one or more functions can occur in association with the user's registration:

The application can direct another device to send a confirmation welcome email to an email address associated with the user. This communication can be app or server driven. App driven examples can send a message to the server related to the user's account which prompts the server to send a message. An example of a server driven message is a message automatically sent via a timer or at the prompting of another service interfacing with the Tripdots network 106. Hyperlinks can be provided in the email. The links can cause functions to occur on another device when accessed, such as flags to be set to enable aspects of the app, communicated with the app after selection of the hyperlinks.

A user account can be established on another device and referenced via a database having access limited to an administrator. Establishment and referencing can be reported, such as via a log file or a message to a device accessible to an administrator. In some examples, the database can be a Microsoft SQL database having designated administrative controls.

FTP and HTTPS networked services can receive the data from web-bases service provided, such as the following of their equivalents:

Upon communication of a VIN, a VIN lookup service such as DataOne Software of Beverly, Mass., can provide access to a VIN database, and, in association with the VIN, can communicate specs, image and editorial related to the vehicle, such as to the mobile device or to a user's account on a web-server device accessible by a user.

A OBD or vehicle head unit interface such as one manufactured by Numerex of Atlanta, Ga., can communicate OBD device data, such as from an TripConnect Device, from or to the Tripdots service. In an example, the OBD information service operates the TripConnect Device to provide code information to the Tripdots service, which can reference the code information with a lookup table, either resident at the Tripdots service, or accessible via another service, which can messages some part of the Tripdots service, such as the mobile device, with message information associated with the code information.

One or more modules can provide support for Facebook Connect for user registration and "Check-in" support. Upon being provided with user login information, a social networking service such as Facebook Connect can communicate an authentication key with the Tripdots service, such as to enable the Tripdots service to access other services using the authentication key.

Upon being provided with user login information, a network-based check-in service such as Foursquare of New York, N.Y., or Placecast of San Diego, Calif. can communicate an authentication key with the Tripdots service, such as to enable the Tripdots service to access other services using the authentication key. One or more modules can provide support for FOURSQURE API for "Check-in" support.

Module 2: User Settings, Model Selection and Expense Data Entry

By configuring one or more user settings, a user can select a unit system under which one or more parameters may be displayed to the user. Example parameters include remaining fuel volume, vehicle speed, distance traveled by the vehicle, preferred currency, time zone, location and other parameters. User settings can be manually modified in a setting screen of the application. Default settings can be automatically determined, such as by using GPS location at the time of creation of the user's account and selecting settings associated with a region including that location.

Vehicle model selection can be automatic. Entering the VIN of the vehicle can expedite of determination of vehicle information, such as make, model, trim and year. Using the VIN and vehicle information, a web services provider such as a DataOne can grant access to a source file stored in a database, and the application can read the source file and automatically populate the user's account with associated data, including, but not limited to, year make, model and a stock OEM photo or another image selected by the user, including an image captured by an optical sensor of a mobile device on which the application executes. The data read can be stored in a user's account on another device, and can be subdivided by user vehicle. Updated information associated with the VIN, such as updated information from a DataOne source file or another service provider, can be automatically delivered to the application periodically, such as on a weekly basis.

Further settings are associated with the user's personalized profile. A user can select an image stored in a data store of the mobile device, or can capture a new image, such as by using an optical sensor of the mobile device.

Users can select a unique screen name to identify the user in virtual areas accessible to other devices, such as without input of a security code such as a password. The unique screen name, or "handle," can be used in other Tripdots systems.

One of the settings the user can configure is an override of automated (GPS) previously defined location information. As an example, a user can select a country such as via dropdown, a language such as via dropdown, currency such as via dropdown, volume units such as via dropdown (possible selections include gallons, imperial gallons, liters, etc.), speed and/or distance such as via dropdown (possible selections include kilometers or miles).

Examples have the same service cloud provide the ability for the user to use the next version of the mobile app on their device with the option to not use the OBD II device to get GPS location and related trip segment data.

A further user setting is an opt in/out setting, by which the user can choose whether they share location, they can control friend invites, they can control whether they receive messages from friends, and they can control whether they receive. push notifications Certain examples allow a user to select vehicle maintenance reminder intervals for one or more services. For example, a user can select to receive an oil change reminder every three thousand miles or a tire rotation reminder every five thousand miles. This function of the application can enable users to manually enter the servicing intervals. This in turn will power the Reminders functions.

FIGS. 5A-B and 6A-B show a display showing field to enter expense information. Certain settings are associated with vehicle expense user input and tracking Expense tracking can include storing a manual user input on the mobile device, and optionally communicating the input to another device. Expenses related to the vehicle can be entered by the user with the keyboard. Expenses can be divided into groups, such as a payments group, a maintenance group, and others. The cloud system and platform can automatically organize vehicle trip data to allow the user to set allowable automatic calculations for expense report for employer reimbursement, allowable tax deductions (different rules in different countries but we are focused on the US today) and or automatic trip segment calculations for backup of client billable drive trips/ distance and time.

An example app can be powered by our same cloud services and includes the ability to not require the OBD device for trip detail capture. Examples capture the data, organize it and deliver data reports to the user or anonymous aggregate vehicle trip data to other partners. This can be independent of using the OBD II device, such as via only a mobile device (e.g., handset) and associated application. Examples can allow for the user to input expense rates 502, and expense rules 504. Rules can be used to associate a first rate with a first trip for a first trip distance, and optionally a second rate with a second trip for a second trip distance, and so on. A time-based listing of expenses can be displayed 610. The timing can be week-by-week or according to another time scale. Information such as contacts, businesses, location name, and trip purpose can be associated with each expense can be also be displayed 612.

Figure 7A:
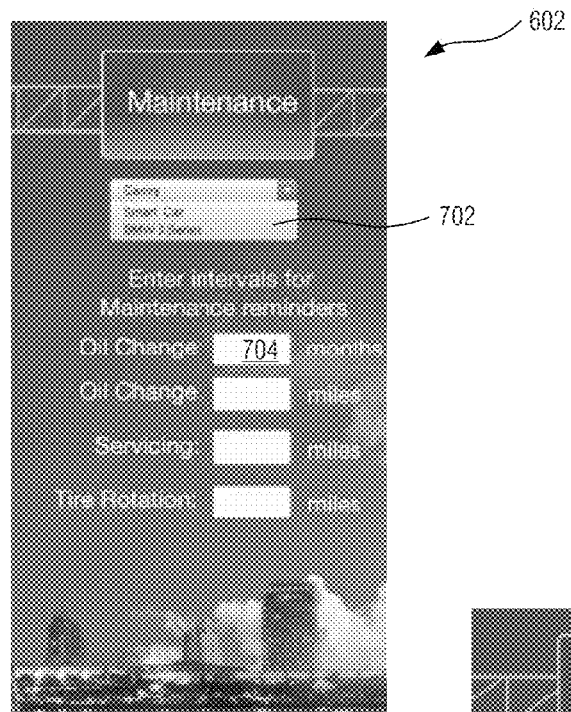
FIG. 7A shows a "Maintenance" portion of an expenses display that can be used to track maintenance payments, according to an example.

FIG. 7A shows a "Maintenance" portion of an expenses display that can be used to track lease or loan payments tracking A car can be selected using a dropdown 702. A "Maintenance" section can be used to enter 704 expenses related to tires, oil changes and general service expenses. A category "other" can be used for miscellaneous expense capture. If present, a device such as a device connected to vehicle OBD can inform a fuel usage gauge of the application to prepare an operating expense report that includes fuel usage.

Examples can automate the calculation per for vehicle trip segment purpose, contact, distance, time and calculated expense for employer reimbursement or allowable tax deduction data back up using the purpose, contact, and related information.

Figure 7B:
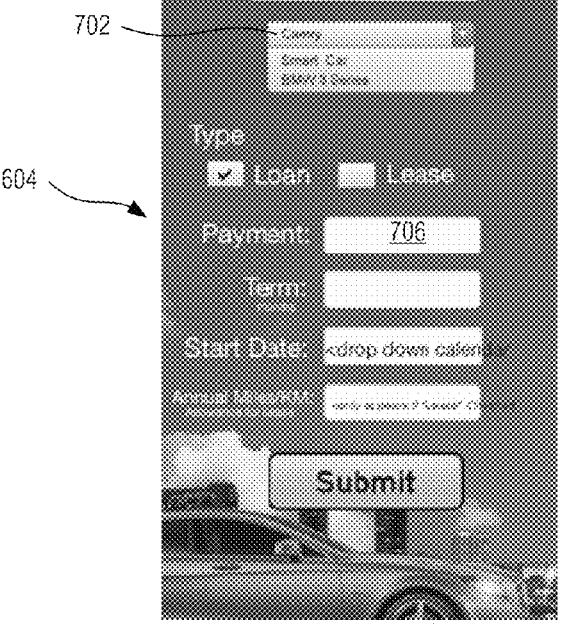
FIG. 7B shows a "Payments" portion of an expenses display that can be used to track lease or loan payments tracking, according to an example.

FIG. 7B shows a "Payments" portion of an expenses display that can be used to track lease or loan payments tracking A car can be selected using a dropdown 702. A user can input 706 loan payments that can be used by the application to prepare an operating cost report that includes fuel usage. A user can also input into the application a lease or loan start date, annual miles allowed within lease payment and timing and amount of a monthly lease or loan payment. Users can input into the application monthly insurance payments for the vehicle. Users can input into the application the term of the loan or lease, such as in months. The application can store an inputted annual mileage or kilometer allowance.

Module 3: Automated Vehicle Calculations, Gauges and Push Messaging

Figure 8A:
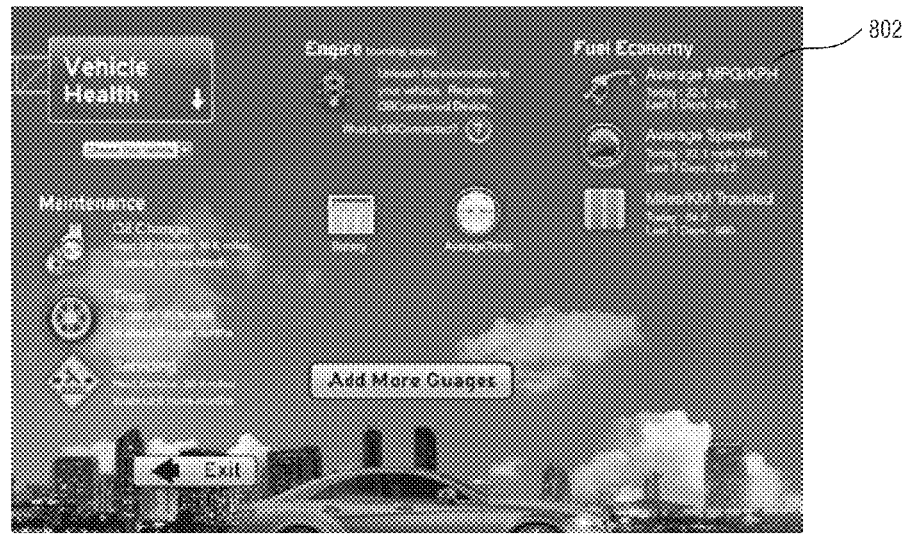
FIG. 8A shows gauges associated with operation of a vehicle, according to an example.

FIG. 8A shows gauges associated with operation of a vehicle. This module can calculate and display information previously entered into the Tripdots app or captured via the TripConnect Device. The display screen can display an image resembling vehicle gauges to convey the related display data to the user of the Tripdots app or some other portion of the Tripdots service, such as a web client.

Figure 8B:
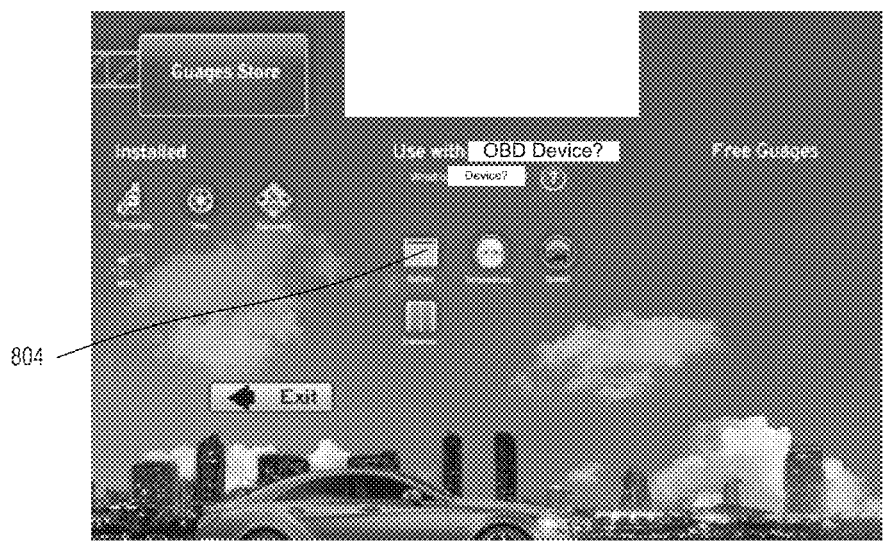
FIG. 8B illustrates a Gauge Store, according to an example.

FIG. 8B illustrates a Gauge Store. Gauges 804 can be selected from a Gauge Store. The Gauge Store can be hosted on a mobile device as part of the Tripdots app. The Gauge Store can include information hosted on another device. The Gauge Store can also be accessed through a web-portal through which the user can interface with the Gauge Store and make choices that are pushed to a mobile device.

New gauges can be added periodically to the Tripdots app by the Tripdots system, providing users with multiple choices for gauges to display, such as on their mobile device. A user can buy or select free gauges to be displayed by the Tripdots app. A user can download gauges from a data store to the Tripdots app, such as by selecting the gauge through an interface of the Gauge Store, displayed on one or both of a mobile device or another computer. Some gauges interact with the TripConnect Device and do not function without the device present. The following describes several gauges.

Certain examples include the cost of operation, and external services such as cloud services can capture, organize and automatically push reports to the vehicle user.

A cost of operating gauge can show the cost over time of vehicle operation, showing cost per week on average or to date, cost per Month on average or to date, Year on average or to date, or the total cost to date. An algorithm used to calculate the cost of ownership can sum car payment information for a period, insurance cost for the period, fuel purchased during the period and user entered expenses during the period.

A recalls and service bulletins gauge can indicate whether one or both of a recall or service bulletin have been issued that affects the vehicle. As an example, the gauge can indicate the number of such documents, including the total number, and the number that are unread. In an example, the documents can be based on a database file lookup, such as one performed by a service provider such as a service provider external to the Tripdots system. A user may press the gauge displayed on the mobile device to switch to a recalls display.

An oil change gauge can display time since last oil change or distance since last oil change. Oil change intervals can be user-defined or derived from external data supplied by the TripConnect Device or a $3^{rd}$ party communicating with the TripConnect Device. Interval starts can be based on user-entered information, such as when a user enters initial mileage at the start of using the Tripdots system.

A tire service gauges can show time or distance since tires or another vehicle components were purchased or serviced. For example, a gauge can show time since tires were purchased or rotated.

A service gauges can be user-defined to indicate a countdown time and/or distance to a service. A recommended service interval can be input by a user or based on a database file provided by a web service in communication with the Tripdots system. In some examples, a VIN lookup service, in providing information about the vehicle, also can provide information from manufacturer including service intervals. In an example, a reminder to perform a service is provided at periodic intervals, such as every week or every thousand miles. In some examples, a user can select to indicate that the service has been performed, or can select to dismiss the reminder, at which point a future reminder can be scheduled.

A vehicle efficiency gauge can indicate vehicle efficiency such as average vehicle efficiency, for example, expressed as miles per gallon. In one example, the gauge can divide a specified distance (since last distance counter reset, overall, etc.) by a volume of gas purchased.

Certain gauges can interact with the TripConnect Device and operate only when an TripConnect Device has communicated to the Tripdots service that an TripConnect Device has been coupled with the vehicle. One gauge is an enhanced oil change gauge. The enhanced oil-change gauge can enable users to set an interval, rather than use one provided. Additionally, the enhanced oil-change gauge can indicate whether onboard diagnostics recommend that the oil be changed.

An enhanced tire monitor can indicate to the user the tire pressure in one or more tires. The pressure can be a measure of tire pressure, or whether the tires are below a threshold. The tire pressure information can be provided by onboard diagnostics, such as via an TripConnect Device.

An enhanced service gauge can provide the information described above in relation to the service gage, but also relay OBD messages, such as trouble codes and associated definitions of trouble codes. Additional information associated with an OBD code can be provided by another device using a web service in communication with the application.

A battery gauge can indicate battery state information collected from the vehicle communication bus. For example, the battery gauge can indicate voltage for a starting battery.

A temperature gauge can indicate the temperature of one or more vehicle systems, including, but not limited to, water temperature, oil temperature, battery temperature, traction motor temperature, cabin temperature, brake temperature and other temperatures. Temperatures can be displayed in any user selected dimensional scale, including, but not limited to, ° F. and ° C.

Other enhanced gauges include, but are not limited to, enhanced vehicle efficiency, enhanced speed indication and enhanced distance traveled. Each of these can relay or derive indications from a vehicle communication bus such as the OBD communication bus.

Examples can provide reminders to users of the application. Reminders can originate from various sources within the application and can provide the user with information on a schedule, and also to focus the attention of the user. Reminders can appear in a portion of the application (e.g., a Message Center) as well as being pushed to the application or to some other application residing on the device on which the application operates. Examples of other applications include, but are not limited to, Microsoft Live Tile. In some examples, Live Tile can indicate that there are unread reminders are in the Message Center of the application.

Examples can push reminders that can include trip segments and related automatically calculated values for reimbursement record or allowable tax deduction expense.

Examples of reminders include recall reminders such as an NHTSB Recall reminder; a service bulletin reminder such as a NHTSB service bulletin reminder and a service reminder, a service reminder, among others. Forming a portion of the reminder can be text or a gauge that can indicate when the next service is due. In an example, the timing of the reminder can be associated with information disseminated by the vehicle manufacture. Such information can be stored on a mobile device on which the application operates, or communicated from another device in communication with the mobile device. Reminders can show time until next scheduled oil change. A reminder can also show an indication that a vehicle temperature is out of a specified range. Such a reminder can show how far the temperature is out of the specified range, such as by indicating how many degrees out of the range the temperature is from.

A reminder can provide social networking information. For example, a reminder can show that an application such as Facebook Friend Connect includes a message. Such a message could be that a particular user wants to be friends, i.e., be granted access to the user's social network account such that they can view or contribute information.

One or more modules can provide support for push notification services such as Microsoft push notification services. Push notifications service can include support for subsequent integration of Urban iAirship Rich push notification services compatible with iOS and Android operating systems.

Module 4: Social Networking, Messaging and Leaderboards

This module can enable users to share their experiences with other Tripdots users. The module can also enable users to share their experiences with other Tripdots users via a social network such as Facebook. A Leader Boards function of the Tripdots, embodied as a portion of the Tripdots application operating on a mobile device, and/or a portion of an application running on another device in communication with the mobile device, can allow users to compare vehicle performance data with others Tripdots users.

Figure 9A:
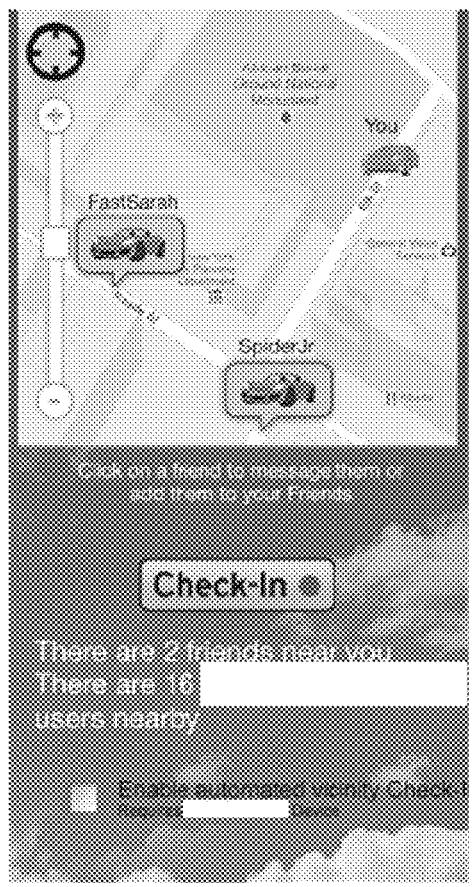
FIG. 9A illustrates an example of a Map, displayed by the Tripdots app, that can show Tripdots users in a particular location, according to an example.

FIG. 9A illustrates an example of a Map, displayed by the Tripdots app, that can show Tripdots users in a particular location. The location of the users can be updated, such as periodically or in real time. Data to populate the map can originate from the TripConnect Device and/or from some other information provider, such as a web service queried by the Tripdots app to provide location information of the user's mobile device and/or the mobile devices of other users.

The Map can display one or more of the following: user's current location and the location of other Tripdots users displayed visually on a map such as with each user's Screen Name. Each Tripdots user can be represented by an icon such as their vehicle picture. A check-in function can allow users to publish their locations to network-based services such as Facebook (such as by using a network-based social networking service) and/or Foursquare (such as by using a network-based check-in service). A tracking process can allow an TripConnect Device to log the location, such as by logging location coordinates, of the TripConnect Device, and thereby the vehicle, to share with other users, such as in real-time. This can be shared regardless of whether the application is launched on a mobile device. These functions can be opted into and opted out of, by way of several example implementations.

Figure 9B:
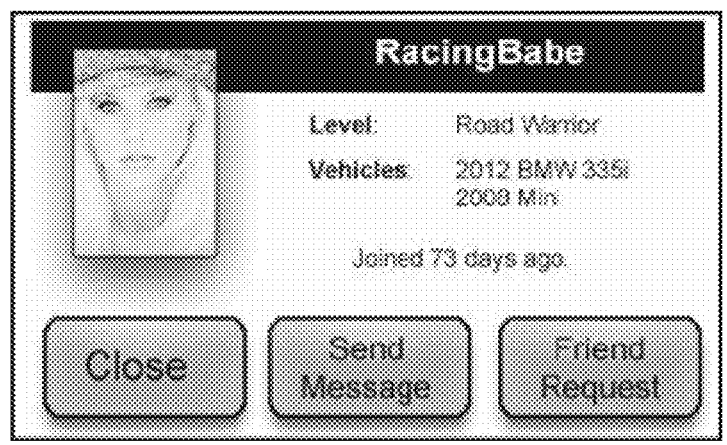
FIG. 9B illustrates a screen to initiate communications, according to an example.

Icons, when touched, can allow users to communicate with each other if their preferences allow for it. A screen to initiate such communications is illustrated in FIG. 9B. Such communications can include one or more of sending messages and sending friend requests. In an example, a message event results in a Push notification that can be displayed on a mobile device.

Figure 10A:
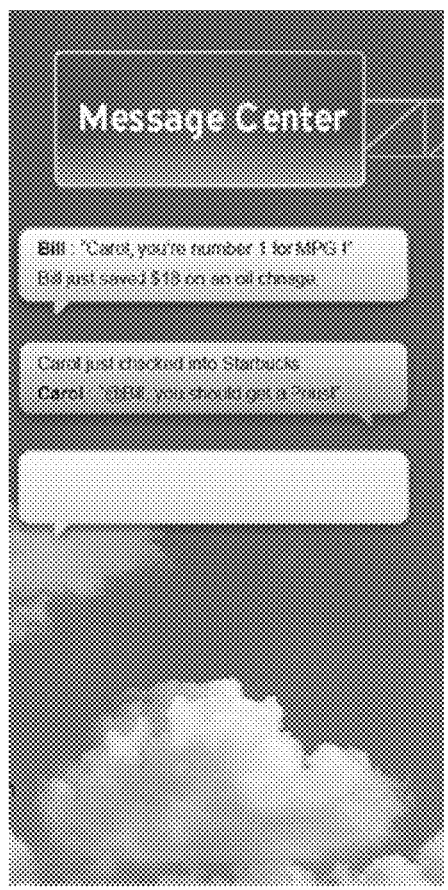
FIG. 10A illustrates a message, according to an example.

FIG. 10A illustrates a message. The application can include a Messaging Center to consolidate and archive all Friend messages, Friend Requests, Push Notifications and Reminders. Unread Messages can remain in the Message Center. Other messages can be automatically archived as read. The Message Center can communicate information to another application, such as Live Tile, which can indicate information about the unread messages, such as the number of unread messages.

The Tripdots system can perform one or more email functions. An example of the Tripdots system can include an email server that can operate independently from Tripdots corporate email (e.g., used by employees) and that can, for example, use the Tripdots.net domain. Examples, of email communications that can be used by the Tripdots system include a welcome message, a Recall Message including a Requested Recall Report or information pushed to the user, and a Password Recovery Message that can optionally include HTML that can be used to direct a web browser or some other HTML reading application on a device such as mobile device to access another device to recover a password. The HTML can optionally include key data to enable the other device to provide the password or to reset the password.

Figure 10B:
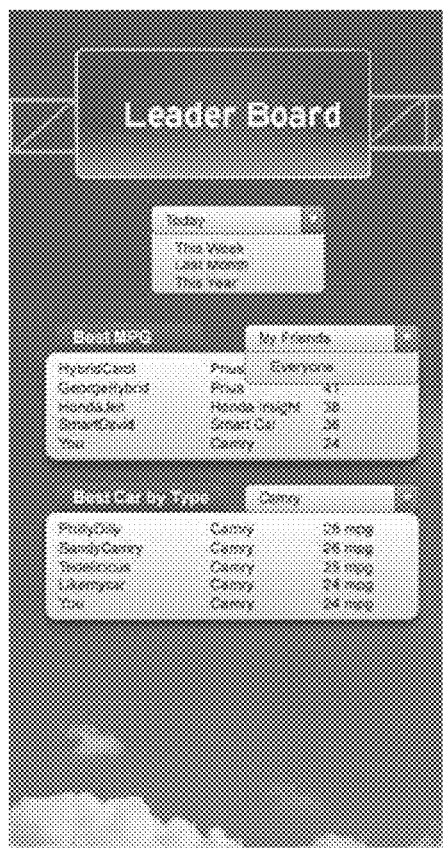
FIG. 10B illustrates a Leader Board function that can operate as part of the app, according to an example.

FIG. 10B illustrates a Leader Board function that can operate as part of the app. The Leader Board function can allow users to see how their vehicle performance compares to other users. The Leader Board can include multiple boards that can display different tracked metrics, such as metrics that have been archived. A Leader Board can be sorted by a vehicle efficiency metric (e.g., MPG), in an example. Vehicles sorted can include those a set of everyone using Tripdots, a set limited to friends, and a set of persons operating a particular type of vehicle (i.e., limited to vehicles of a particular make, model, trim level or option package). Other vehicle information disclosed herein can be used to form a Leader Board. Leader Boards can be limited to certain time periods.

Module 5: Tripconnect Device

This module determines the status of a device coupled to a vehicle in communication with a communications bus of the vehicle. In an example, this module determines the status of an TripConnect Device that is plugged into the OBD-II port on the vehicle. Communications and data services between the device and the Tripdots app can be provided by a $3^{rd}$ party that can manage the TripConnect Device and that can provide information from the device to a cloud network service. The $3^{rd}$ party can include a web service in communication with the device.

In an example, the application can display a green status indicator that can indicate that the TripConnect Device has been provisioned and is associated with the Users mobile Tripdots app and is communicating data with the service. In an example, TripConnect Device status can set by an Tripdots administrative user at time of device purchase.

The TripConnect Device can communicate information associated with one or more of the following, with example units listed in parentheses: battery voltage level (e.g., volts); ignition on event and concomitant engine state and OBD state; ignition off event and concomitant engine state and OBD state; vehicle efficiency (e.g., MPG); engine or motor temperatures (e.g., degree); fuel level (e.g., percent of capacity based on a predetermined fuel capacity such as one stored in a database); fuel consumption rate; and malfunction indicator light code (e.g., one or more of the code being communicated, an indication that a code is being communicated, and information associated with the code, such as a standard meaning of the code or a manufacturer specific meaning of the code.); vehicle location (e.g., GPS latitude over longitude, optionally correlated with an address provided by a web service such as Bing); and Last Vehicle Stop while running (e.g., one or more of time, latitude over longitude).

Module 6: Web Administration Application

Examples include an account management application. The account management application can be a web application. This management application can include a user interface that supports one or more of: access to backend data sets to flag accounts that are enabled with the TripConnect Device; account lookup by one or more of Last Name, Email, Screen Name and Mobile Phone Number (e.g., MDN).

The management application can view and edit data fields related to an TripConnect Device including, but not limited to: International Mobile Equipment Identity ("IMEI") #; TripConnect Device Status; TripConnect Logged Data Records; TripConnect Device enable/disable Service; Whether the account is paid; Shipping address (street, city, state, country, postal code, phone); Date Shipped; Date Activated; Amount Paid; Tax collected; Sales Transaction ID# and Last time used (OBD can send last reported event when in vehicle).

The management application can view and edit data fields related to an Tripdots system including, but not limited to: a flag to enable or disable TripConnect service; user preferences and opt-In fields; vehicle type; user information (e.g., user account information); last time application used (date and/or time); account created date; an option to set user account status flag to one of: active, cancelled; suspended; and banned; and an option to export data to XLS or CSV for a date range.

These modules can work independently or together as requested by users or managers of the system. App examples can include one or more of the following optional aspects. Within one or more modules, text strings can be read from an external table to facilitate subsequent language translations and internationalization. One or more modules can provide support for reduced SQL data usage. Some examples can use a thread local storage. ("TLS"). One or more modules can provide support for path redundancy between two service providers (e.g., 112, 120, and 140). One or more modules can provide terms of service ("TOS") and privacy policy changes encourage user acceptance on next app launch. TOS and privacy copy can be hosted on the web services for copy updates. Examples can provide a free Tripdots app (e.g., with no TripConnect Device) limited to two vehicles. One or more modules can provide dynamic field labels based on user preferences for international support (e.g., miles, kilometers). One or more modules can provide dynamic help screens via web services.

To enable the execution of certain functions discussed herein, data sets can be integrated into the application, including, but not limited to automobile lists by manufacturer, model, year; a country list; and a language list. Also, to enable certain functions, the application can initiate 'send' email and send/receive messages. An email server can be separately configurable from an existing email, e.g., Tripdots.com, and can reside on another domain, e.g. Tripdots.net.

Advertising

Figure 11A:
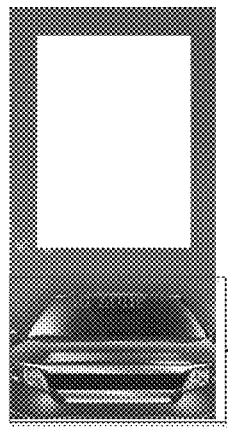
FIGS. 11A through 11C illustrate screens with areas or ad zones reserved for ad placement, according to an example.
Figure 11B:
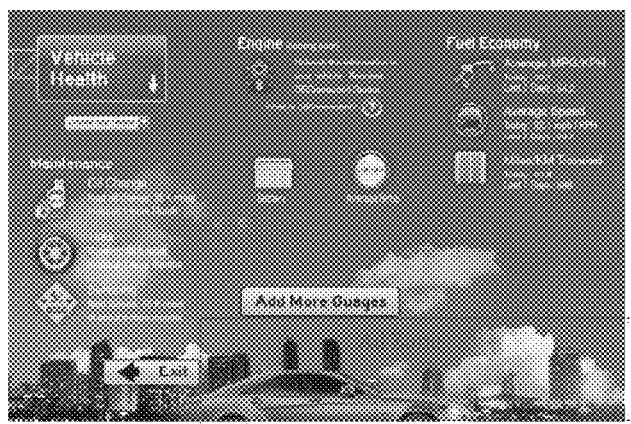
Figure 11C:
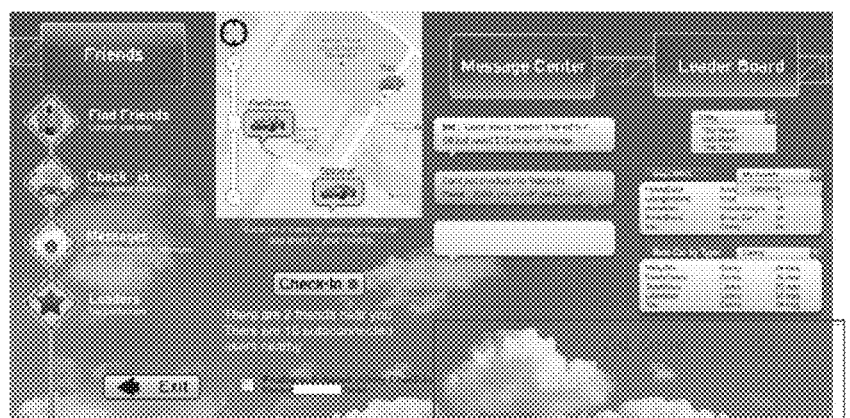

FIGS. 11A through 11C illustrate screens with areas or ad zones reserved for ad placement. The Tripdots system can provide for advertising, such as within the app. Ads can conform to a pre-defined size that can fit into a determined ad location or "zone" on specific screens of the app. Ad zones can be available on an initial "splash screen" and other screens as shown in FIGS. 11A-C, in which zones 1102 are illustrated. Ad zones can be dynamically updated from web services. Ads can include static images or animated images. Ads can include Internet links such as links compatible with HTML5, and can support analytics, such as by sending user information to another device when the ad is selected.

Notes

Location—For the purposes of this document and the associated claims, the term "location" is used to refer to a geographic location, such as a longitude/latitude combination or a street address. The term location is also used within this specification and claims in reference to a physical location associated with a retail outlet (e.g., store).

Real-time—For the purposes of this document and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Example Operating Environment

Figure 12:
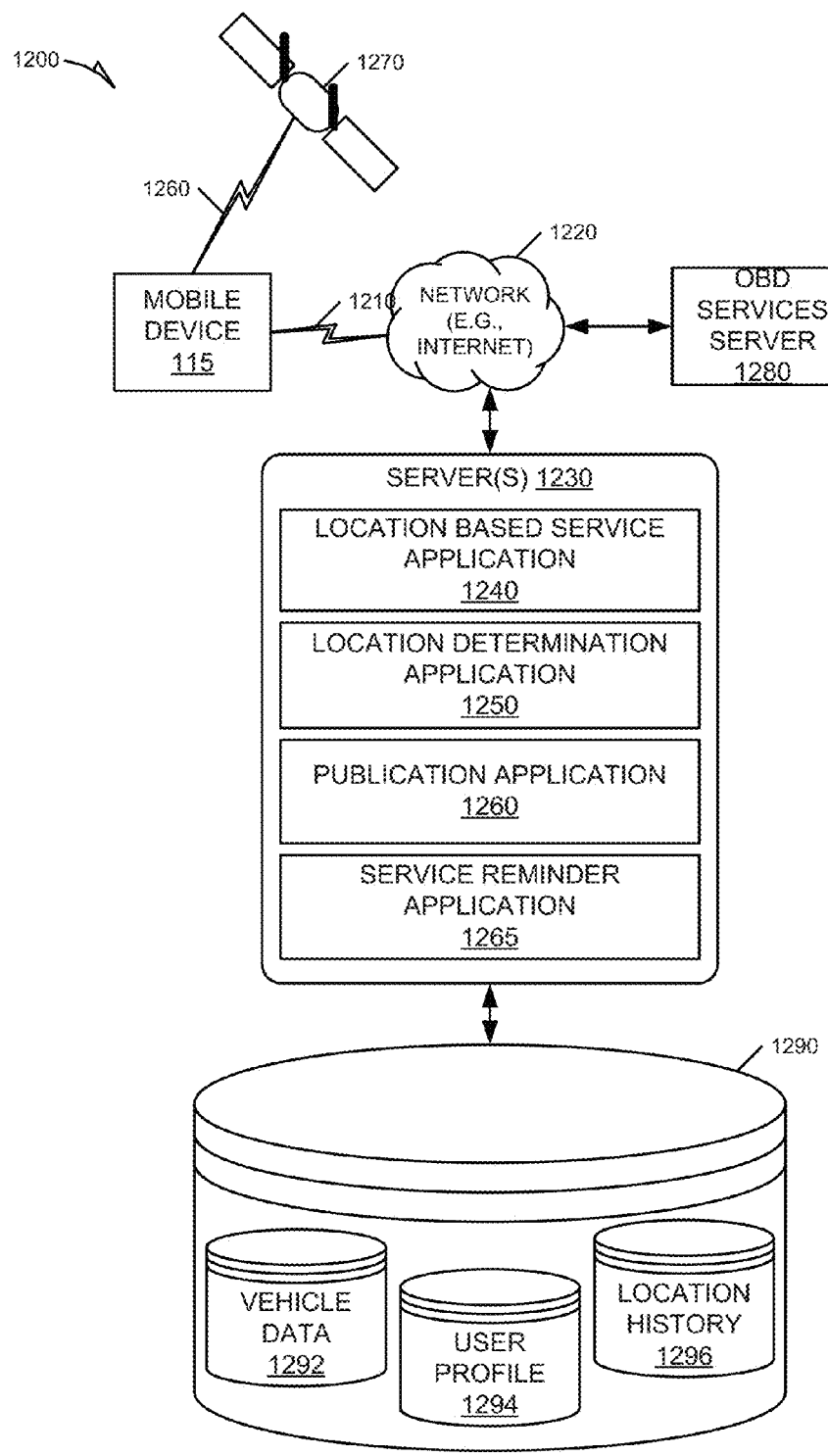
FIG. 12 is a block diagram illustrating an environment for operating a mobile device, according to an example.

FIG. 12 is a block diagram illustrating an environment for operating a mobile device, according to an example embodiment. The environment 1200 is an example environment within which methods of vehicle monitoring. The environment 1200 can include a mobile device 115, a communication connection 1210, a network 1220, servers 1230, a communication satellite 1270, an OBD or vehicle head unit interfaces server 1280, and a database 1290. The servers 1230 can optionally include location based service application 1240, location determination application 1250, publication application 1260 (e.g., to publish information to services), and a service reminder application 1265. The database 1290 can optionally include a vehicle databases 1292, user profile database 1294, and/or location history database 1296. The mobile device 115 represents one example device that can be utilized by a user to monitor vehicles. The mobile device 115 may be any of a variety of types of devices (for example, a cellular telephone, a personal digital assistant (PDA), a Personal Navigation Device (PND), a handheld computer, a tablet computer, a notebook computer, or other type of movable device). The mobile device 115 may interface via a connection 1210 with a communication network 1220. Depending on the form of the mobile device 115, any of a variety of types of connections 1210 and communication networks 1220 may be used.

For example, the connection 1210 may be Code Division Multiple Access (CDMA) connection, a Global System for Mobile communications (GSM) connection, or other type of cellular connection. Such connection 1210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 1220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 1210 may be Wireless Fidelity (Wi-Fi, IEEE 1802.11x type) connection, a Worldwide Interoperability for Microwave Access (WiMAX) connection, or another type of wireless data connection. In such an embodiment, the communication network 1220 may include one or more wireless access points coupled to a local area network (LAN), a wide area network (WAN), the Internet, or other packet-switched data network.

In yet another example, the connection 1210 may be a wired connection, for example an Ethernet link, and the communication network may be a LAN, a WAN, the Internet, or other packet-switched data network. Accordingly, a variety of different configurations are expressly contemplated.

A plurality of servers 1230 may be coupled via interfaces to the communication network 1220, for example, via wired or wireless interfaces. These servers 1230 may be configured to provide various types of services to the mobile device 115. For example, one or more servers 1230 may execute location based service (LBS) applications 1240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 1240 can provide location data to a network-based check-in system 120, which can then be used to assist in generating offers relevant to the user's current location. Knowledge of the device's location, and/or the location of other devices, may be obtained through interoperation of the mobile device 115 with a location determination application 1250 executing on one or more of the servers 1230. Location information may also be provided by the mobile device 115, without use of a location determination application, such as application 1250. In certain examples, the mobile device 115 may have some limited location determination capabilities that are augmented by the location determination application 1250. In some examples, the servers 1230 can also include publication application 1260 for providing location-aware offers that may be triggered by present or past check-ins with the network-based check-in service 120. In certain examples, location data can be provided to the publication application 1260 by the location determination application 1250. In some examples, the location data provided by the location determination application 1250 can include merchant information (e.g., identification of a retail location). In certain examples, the location determination application 1250 can receive signals via the network 1220 to further identify a location. For example, a merchant may broadcast a specific IEEE 1802.11 service set identifier (SSID) that can be interpreted by the location determination application 1250 to identify a particular retail location. In another example, the merchant may broadcast an identification signal via radio-frequency identification (RFID), near-field communication (NFC), or a similar protocol that can be used by the location determination application 1250.

Example Mobile Device

Figure 13:
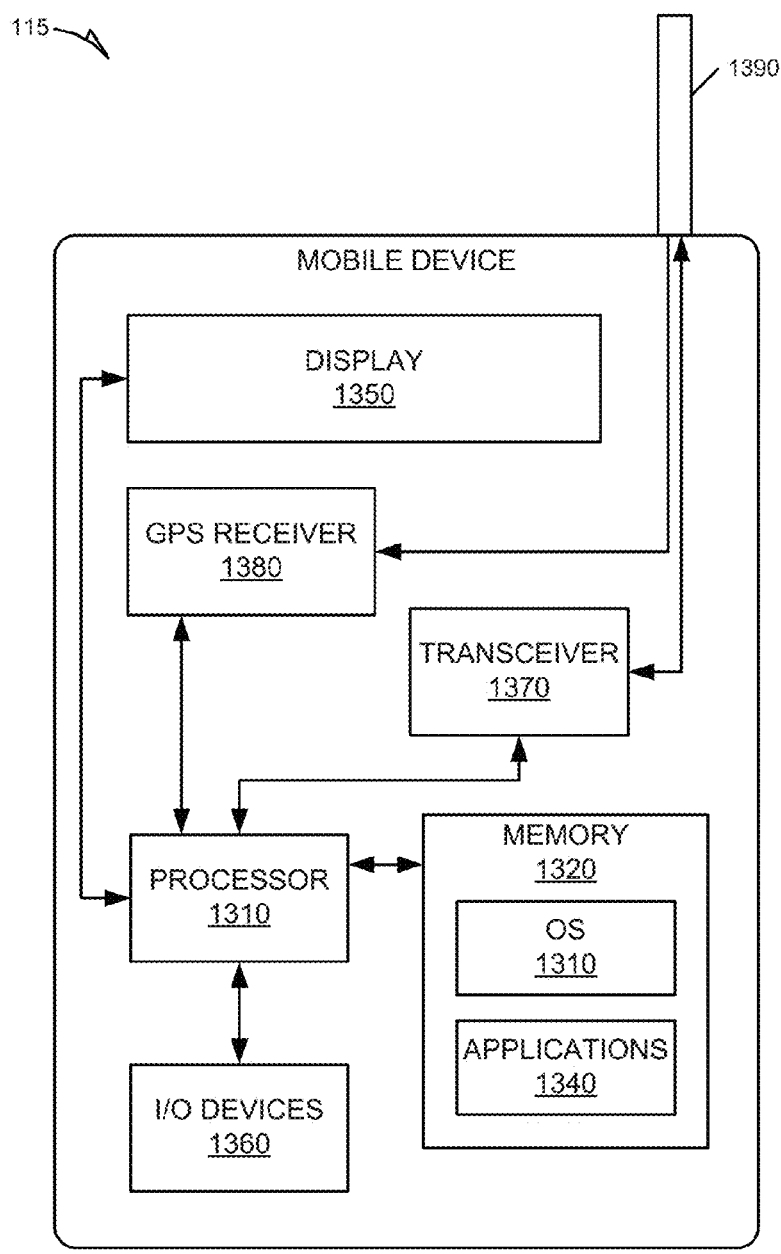
FIG. 13 is a block diagram illustrating a mobile device, according to an example embodiment, according to an example.

FIG. 13 is a block diagram illustrating a mobile device, according to an example embodiment. The mobile device 115 may include a processor 1310. The processor 1310 may be any of a variety of different types of commercially available processors suitable for mobile devices (for example, an XScale architecture microprocessor, a Microprocessor without Interlocked Pipeline Stages (MIPS) architecture processor, or another type of processor). A memory 1320, such as a Random Access Memory (RAM), a Flash memory, or other type of memory, is typically accessible to the processor. The memory 1320 may be adapted to store an operating system (OS) 1330, as well as application programs 1340, such as a mobile location enabled application that may provide LBSs to a user. The processor 1310 may be coupled, either directly or via appropriate intermediary hardware, to a display 1350 and to one or more input/output (I/O) devices 1360, such as a keypad, a touch panel sensor, a microphone, and the like. Similarly, in some embodiments, the processor 1310 may be coupled to a transceiver 1370 that interfaces with an antenna 1390. The transceiver 1370 may be configured to both transmit and receive cellular network signals, wireless data signals, or other types of signals via the antenna 1390, depending on the nature of the mobile device 115. In this manner, the connection 1210 with the communication network 1220 may be established. Further, in some configurations, a GPS receiver 1380 may also make use of the antenna 1390 to receive GPS signals.

Example Platform Architecture

Figure 14:
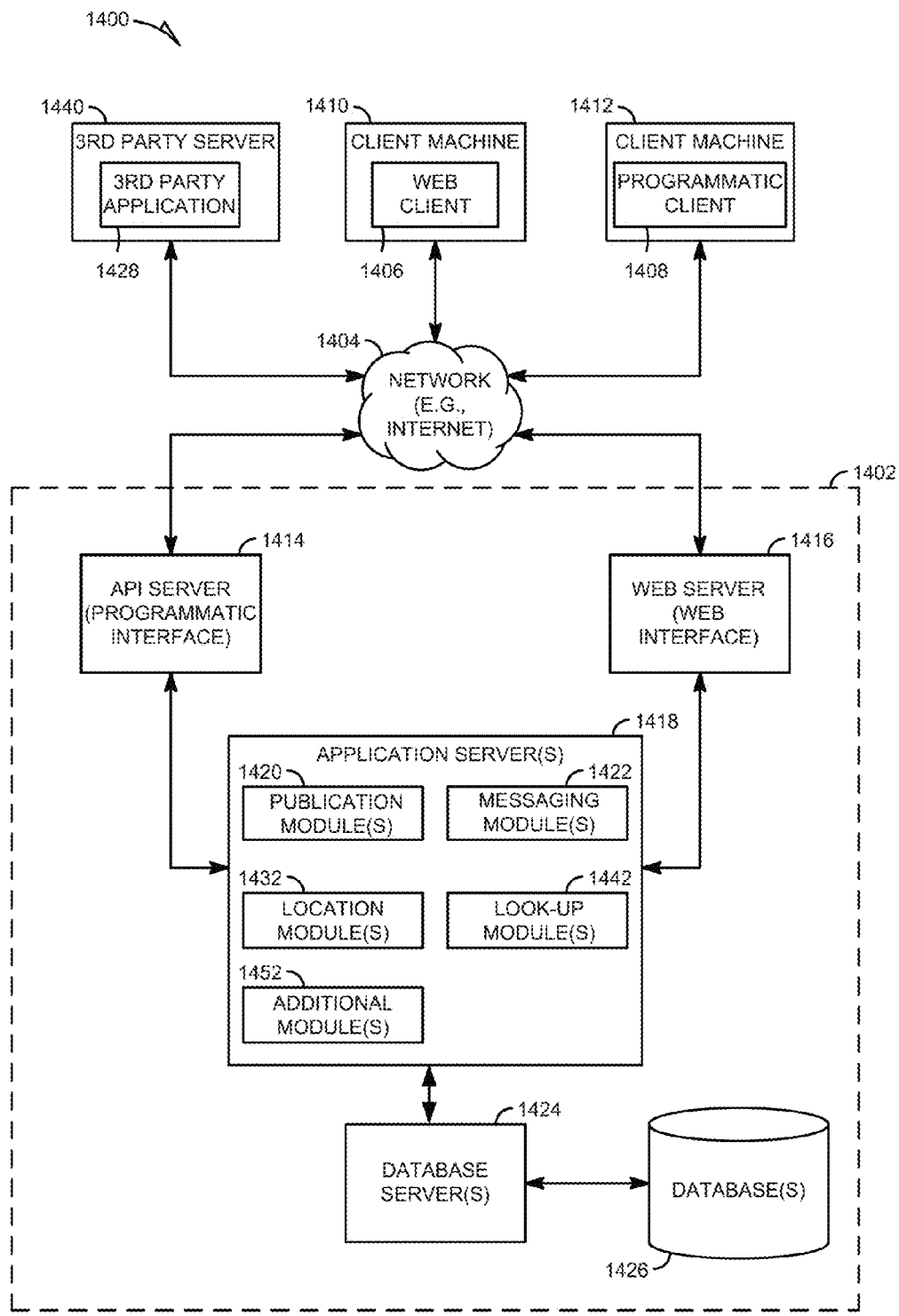
FIG. 14 is a block diagram illustrating a network-based system 1400 for delivering vehicle monitoring services, according to an example.

FIG. 14 is a block diagram illustrating a network-based system 1400 for delivering vehicle monitoring services, according to an example embodiment. The block diagram depicts a network-based system 1400 (in the exemplary form of a client-server system), within which an example embodiment can be deployed is described. A networked system 1402, in the example form of a network-based vehicle monitoring system, that provides server-side functionality, via a network 1404 (e.g., the Internet or WAN) to one or more client machines 1410, 1412. FIG. 14 illustrates, for example, a web client 1406 (e.g., a browser, such as the Internet Explorer browser developed by Microsoft Corporation of Redmond, Wash. State) and a programmatic client 1408 (e.g., WHERE™ smartphone application from Where, Inc. of Boston, Mass. or FOURSQUARE™ smartphone application from Foursquare, Inc. of New York, N.Y.) executing on respective client machines 1410 and 1412. In an example, the client machines 1410 and 1412 can be in the form of a mobile device, such as mobile device 115.

An Application Programming Interface (API) server 1414 and a web server 1416 are coupled to, and provide programmatic and web interfaces respectively to, one or more application servers 1418. The application servers 1418 host one or more publication modules 1420, messaging modules 1422, location-aware modules 1432 and look-up modules 1442. These are just some of the modules possible, and any of the modules disclosed herein can be configured to operate on the application servers 1418. The modules can perform one or more of the functions described in the above description of modules one through six. The application servers 1418 are shown to be coupled to one or more database servers 1424 that facilitate access to one or more databases 1426. In some examples, the application server 1418 can access the databases 1426 directly without the need for a database server 1424.

The publication modules 1420 may provide a number of publication functions and services to users that access the networked system 1402. The messaging modules 1422 can send messages or notifications to the users. The location-aware modules 1432 may provide real-time location information to users of the networked system 1402. The location-aware modules 1432 can be configured to use all of the various communication mechanisms provided by the networked system 1402 to indicate user location. The look-up modules look up information for use by the user, such as by references a user VIN with information about the VIN stored in the database 1426 to provide the user with the information about the VIN.

While the system 1400 shown in FIG. 14 employs a client-server architecture, the present invention is not limited to such an architecture, and could equally well find application in a distributed, or peer-to-peer, architecture system, for example. The various modules 1420, 1422, 1432 and 1442 could also be implemented as standalone systems or software programs, which do not necessarily have networking capabilities.

The web client 1406 accesses the various modules 1420, 1422, 1432 and 1442 via the web interface supported by the web server 1416. Similarly, the programmatic client 1408 accesses the various services and functions provided by the modules 1420, 1422, 1432 and 1442 via the programmatic interface provided by the API server 1414.

FIG. 14 also illustrates a third party application 1428, executing on a third party server machine 1440, as having programmatic access to the networked system 1402 via the programmatic interface provided by the API server 1414. For example, the third party application 1428 may, utilizing information retrieved from the networked system 1402, support one or more features or functions on a website hosted by the third party. The third party website may, for example, provide one or more promotional, marketplace or payment functions that are supported by applications of the networked system 1402. Additionally, the third party website may provide merchants with access to the local pricing modules 1432 for configuration purposes. In certain examples, merchants can use programmatic interfaces provided by the API server 1414 to develop and implement rules-based pricing schemes that can be implemented via the publication modules 1420, messaging modules 1422, and location-aware modules 1432.

Figure 15:
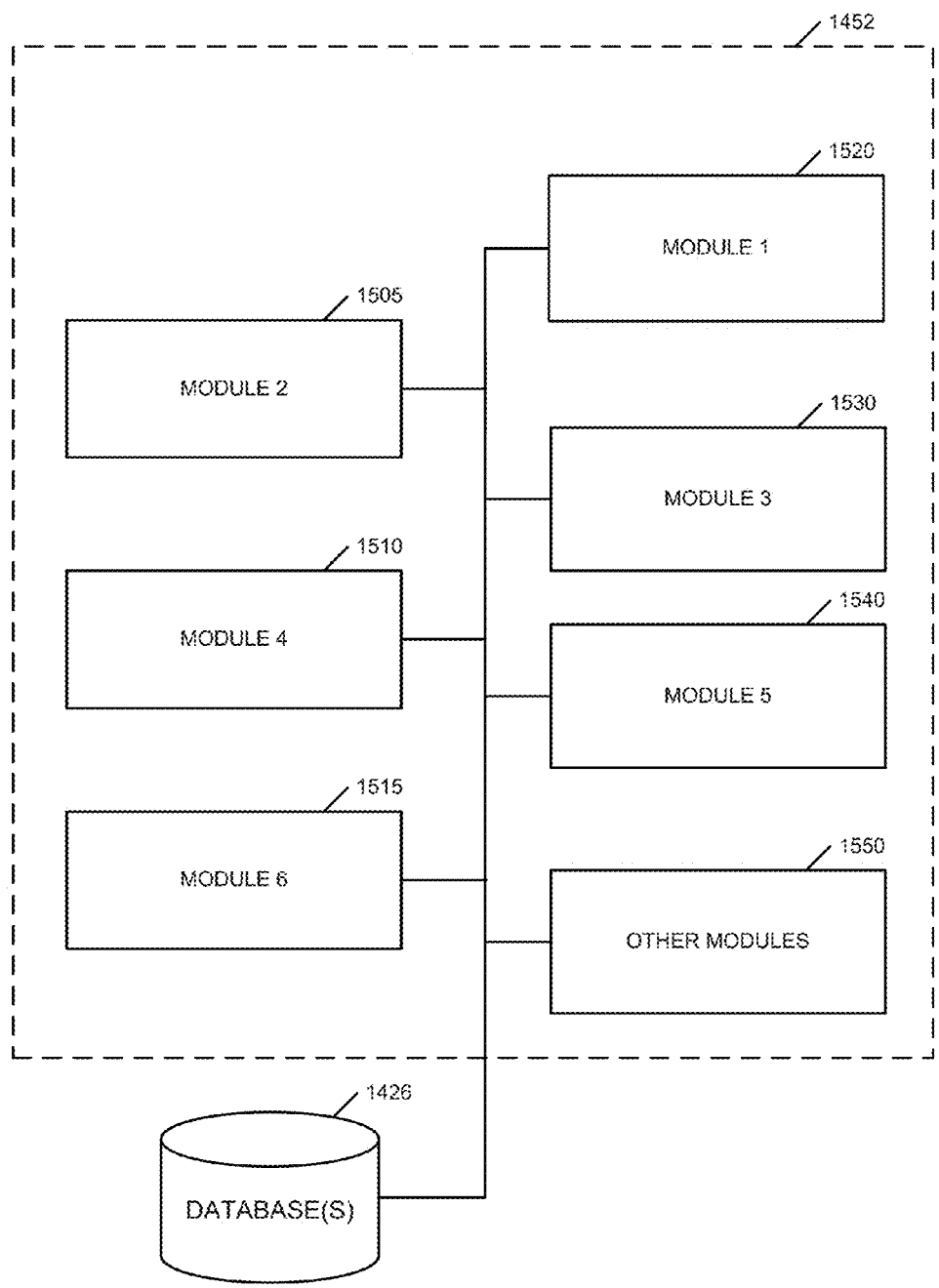
FIG. 15 is a block diagram illustrating modules, according to an example.

FIG. 15 is a block diagram illustrating modules, according to an example embodiment. Additional details regarding the functionality provided by the modules are detailed above.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud network computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
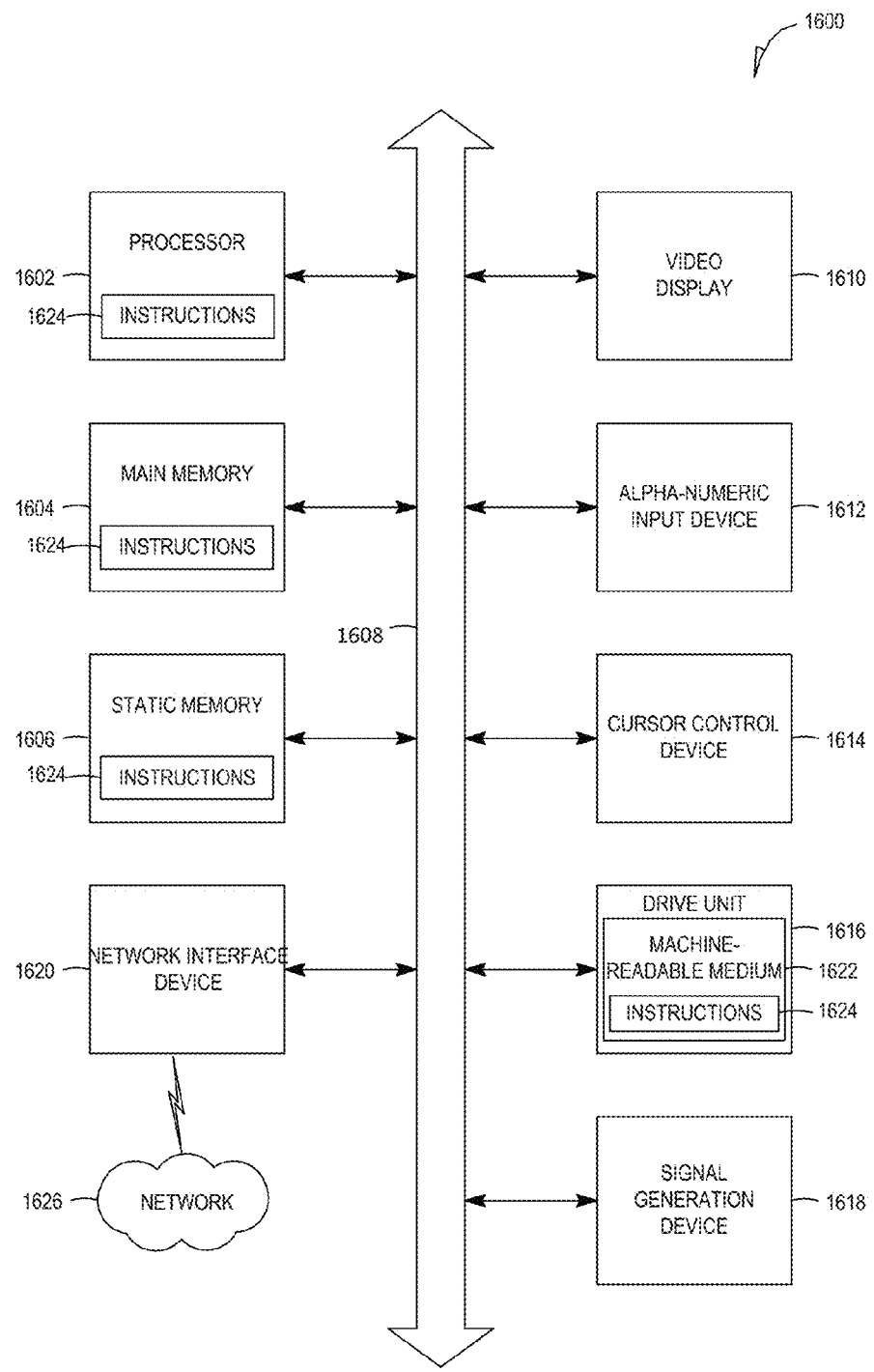
FIG. 16 is a block diagram of machine in the example form of a computer system 1600 within which instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 can further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or used by any one or more of the methodologies or functions described herein. The instructions 1624 may also reside, completely or at least partially, within the main memory 1604, static memory 1606, and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Examples provide for agility in establishing a connection to any telematics or other data customers and partners.

Example XML Definitions

The following represents XML data for communication with the app.
<title>Location reading for Corvette Z06 on Wed, 25 Apr 2012 14:53:49-0500</title>
<description>5405 Patrick Henry Dr, Santa Clara, CA</description>
<device_id>3</device_id>
<imei>359138035803845</imei>
<georss:point>37.40907-121.98451</georss:point><speed>0</speed><direction>0.0</direction>
<pubDate>Wed, 25 Apr. 2012 14:53:49-0500</pubDate>
<altitude>7.7</altitude>
<created_at_utc>2012-04-25 14:53:49-0500</created_at_utc>
<event_type>Heartbeat</event_type>
<note></note>
<ignition></ignition>
<gpio1>false</gpio1>
<gpio2>false</gpio2>
<street_number>5405</street_number>
<street>Patrick Henry Dr</street>
<place_name>Santa Clara</place_name>
<admin_name1>CA</admin_name1>
<geofence_id>0</geofence_id>
<geofence_name></geofence_name>
<geofence_event_type></geofence_event_type>
<firmware>X004-1112E_008e</firmware>
<gateway_profile>HarDef</gateway_profile>
<obdprotocol></obdprotocol>
<vin>1GNET13H272128735</vin>
<seq_id>177</seq_id>
<gateway_timestamp>Wed, 25 Apr. 2012 14:53:46-0500</gateway_timestamp>
<gpsStatusLock></gpsStatusLock>
<hdop>0.9</hdop>
<numberOfSatelites>12</numberOfSatelites>
<batteryVoltage>12.7</batteryVoltage>
<fuelTankLevel></fuelTankLevel>
<mileage>53.0</mileage>
<rpm>0.0</rpm>
<averageFuelConsumption>0.0</averageFuelConsumption>
<acceleration>0.0</acceleration>
<rssi>-83</rssi>
<last_heartbeat_timestamp>Wed, 25 Apr 2012 14:53:49 0500</last_heartbeat_timestamp>
<recently_completed_trip>
<start_location>37.40895-121.98453</start_location>
<end_location>37.34461-122.01347</end_location>
<travel_distance>5.99626</travel_distance>
<averageFuelConsumption>14.6862</averageFuelConsumption>
</recently_completed_trip>
</item> <item>

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   receiving onboard diagnostic data associated with an operational state of a vehicle of a user, the onboard diagnostic data including vehicle trip distance;
   wirelessly communicating the onboard diagnostic data, including the vehicle trip distance, to an external service via a network;
   at the external service, calculating:
      vehicle-related trip expense information based on the vehicle trip distance included in the onboard diagnostic data, and
      tax deductions based on tax rules of a vehicle location, the vehicle-related trip expense information, information manually entered by the user, and information monitored from the vehicle, and
   wirelessly pushing a message to the user from the external service to a mobile device via the network, the message including the vehicle-related trip expense information calculated based on the vehicle trip distance included in the onboard diagnostic data and the calculated tax deductions.

2. The method of claim 1, wherein the onboard diagnostic data is compatible with the OBD-II standard.

3. The method of claim 2, wherein the onboard diagnostic data includes at least one of a trouble code, and the external service is to provide a definition of the trouble code.

4. The method of claim 1, comprising providing information associated with the user from an external service.

5. The method of claim 4, wherein providing the information includes communicating the information from the external service communicates to the vehicle via an internet.

6. The method of claim 5, wherein providing the information includes relaying the information from an original equipment manufacturer, or a supplier thereto, to the vehicle.

7. The method of claim 4, wherein providing the information includes relaying the information from an original equipment manufacturer or a supplier thereto to the vehicle.

8. The method of claim 1, wherein pushing the message is enabled for a first set of data of the onboard diagnostic data upon initiation of the method, and for a second set of data, other than the first set of data, upon installing a device to the vehicle.

9. The method of claim 8, wherein the device is an OBD-II compatible device including an OBD-II compatible connector.

10. The method of claim 1, wherein pushing a message includes pushing at least one of vehicle-related cost information, vehicle tracking information, vehicle management information, lease payment amount, loan payment amount, lease start date, loan start date, annual miles allowed within lease payment, timing of lease payment, timing of loan payment, amount of a monthly lease or loan payment, fuel usage, monthly insurance payments for the vehicle.

11. The method of claim 10, wherein the trip expense information includes expense information provided by another device in communication with the mobile device.

12. The method of claim 10, wherein the trip expense information is associated with at least one of spending in a location, spending with a specific bank account, and time of operation.

13. The method of claim 10, comprising receiving the trip expense information from a point-of-sale device.

14. The method of claim 10, comprising inputting data associated with the message manually into the mobile device.

15. The method of claim 10, comprising keeping a log on the mobile device.

16. The method of claim 10, wherein the vehicle tracking information includes GPS information or point of sale information.

17. The method of claim 1, wherein pushing a message includes displaying a maintenance reminder.

18. The method of claim 17, wherein the maintenance reminder is associated with at least one of manually entered information and information monitored from a vehicle.

19. The method of claim 1, wherein the external service includes information related to safety, recall, service bulletins and crash test scores, and the message is related to at least one of the safety, recall, service bulletins and crash test scores.

20. The method of claim 1, wherein the message includes information from a social network related to another user of the social network.

21. The method of claim 20, wherein the information includes a leaderboard, wherein the user and the another user are ranked in the leaderboard in association with respective onboard vehicle diagnostic data.

22. The method of claim 1, wherein the calculating of the tax deductions is based on a segment of the vehicle trip distance, and the information manually entered by the user includes a purpose of the trip.

23. A non-transitory machine-readable storage medium storing instructions which, when performed by a machine, cause the machine to:

receive onboard diagnostic data associated with an operational state of a vehicle of a user, the onboard diagnostic data including vehicle trip distance;

wirelessly communicate the onboard diagnostic data, including the vehicle trip distance, to an external service via a network; and at the external service, calculate:

vehicle-related trip expense information based on the trip distance included in the onboard diagnostic data, and tax deductions based on tax rules of a vehicle location, the vehicle-related trip expense information, information manually entered by the user, and information monitored from the vehicle, and wirelessly push a message to the user from the external service to a mobile device via the network, the message including the vehicle-related trip expense information calculated based on the vehicle trip distance included in the onboard diagnostic data and the calculated tax deductions.

24. The non-transitory machine-readable storage medium of claim 23, wherein the instructions are to cause the machine to communicate instructions to the mobile device to cause the mobile device to display a first set of data of the message upon communication of the data to the mobile device, and to communicate instructions to the mobile device to cause the mobile device to display a second set of data of the message, other than the first set of data, upon communication to the mobile device that a credit has been transferred to the external service.

25. The non-transitory machine-readable storage medium of claim 24, wherein the second set of data includes a gauge to display the onboard diagnostic data.

26. The non-transitory machine-readable storage medium of claim 25, including instructions to cause the machine to instruct the external service to communicate multiple gauges to the mobile device upon transfer of the credit to the external service.

27. The non-transitory machine-readable storage medium of claim 25, including instructions to cause the machine to instruct the mobile device to display the gauge upon reception of an indication that a device has been coupled to the vehicle.

* * * * *